(12) United States Patent
Okada et al.

(10) Patent No.: US 8,089,562 B2
(45) Date of Patent: Jan. 3, 2012

(54) SIGNAL PROCESSING CIRCUIT

(75) Inventors: Toru Okada, Gunma-Ken (JP); Hiroyuki Ebinuma, Saitama-Ken (JP)

(73) Assignee: Sanyo Electric Co., Ltd., Osaka (JP)

( * ) Notice: Subject to any disclaimer, the term of this patent is extended or adjusted under 35 U.S.C. 154(b) by 1413 days.

(21) Appl. No.: 11/642,903

(22) Filed: Dec. 20, 2006

(65) Prior Publication Data
US 2007/0146184 A1 Jun. 28, 2007

(30) Foreign Application Priority Data
Dec. 28, 2005 (JP) ................................. 2005-379013

(51) Int. Cl.
H04N 5/18 (2006.01)
H04N 5/57 (2006.01)
H04N 5/16 (2006.01)

(52) U.S. Cl. ................ 348/678; 348/694; 348/695

(58) Field of Classification Search ............. 348/695, 348/691, 694, 692, 572, 255, 257, 678, 682
See application file for complete search history.

(56) References Cited

U.S. PATENT DOCUMENTS

| | | | | |
|---|---|---|---|---|
| 5,272,531 A | * | 12/1993 | McGinn | 348/678 |
| 5,512,958 A | * | 4/1996 | Rzeszewski | 348/607 |
| 6,219,107 B1 | * | 4/2001 | Renner et al. | 348/678 |
| 2004/0027483 A1 | * | 2/2004 | Gurley et al. | 348/528 |
| 2004/0027493 A1 | * | 2/2004 | Keen | 348/692 |
| 2006/0093140 A1 | * | 5/2006 | Quan | 380/201 |

FOREIGN PATENT DOCUMENTS

| | | |
|---|---|---|
| JP | 59-123374 A | 7/1984 |
| JP | 62-230168 A | 10/1987 |
| JP | 5075895 A | 3/1993 |
| JP | 6276410 A | 9/1994 |
| JP | 07-184142 | 7/1995 |

OTHER PUBLICATIONS

Taiwanese Office Action for Application No. 95148827, mailed on May 7, 2010 (7 pages).
esp@cenet Patent Abstract for Japanese Publication No. 62-230168, publication date Oct. 8, 1987. (1 page).
esp@cenet Patent Abstract for Japanese Publication No. 59-123374, publication date Jul. 17, 1984. (1 page).
Office Action in Japanese Patent Application No. 2005-379013 mailed Nov. 30, 2010 (1 page).
Abstract, espacenet, in Japanese Publication No. 5075895 Publication date Mar. 26, 1993 (1 page).
Abstract, espacenet, in Japanese Publication No. 6276410 Publication date Sep. 30, 1994 (1 page).

* cited by examiner

*Primary Examiner* — Victor Kostak
(74) *Attorney, Agent, or Firm* — Osha Liang LLP

(57) ABSTRACT

A signal processing circuit includes an auto gain control circuit and amplifies a signal with an amplification ratio determined based on a synchronous signal level having a positive potential with respect to a black level included in a high definition television video signal. In consequence, during the processing of the high definition television video signal, the signal processing is performed with a desired amplification ratio.

3 Claims, 6 Drawing Sheets

BEFORE AMPLIFICATION

AFTER AMPLIFICATION

BEFORE AMPLIFICATION

AFTER AMPLIFICATION

SIGNAL PROCESSING CIRCUIT

CROSS-REFERENCE TO RELATED APPLICATION(S)

The entire disclosure of Japanese Patent Application No. 2005-379013 including specification, claims, drawings and abstract is incorporated herein by reference in its entirety.

BACKGROUND OF THE INVENTION

1. Field of the Invention

The present invention relates to a signal processing circuit which is used to process a high definition television signal.

2. Description of the Related Art

For adjustment of a dynamic range of a video signal and the like, amplification processing is performed by detecting a reference level of the video signal, and then amplifying the whole signal in accordance with the reference level. For the amplification processing, a method is known in which, as shown in FIGS. 5A and 5B, voltage levels $V_{SYNC1}$, $V_{SYNC2}$ (black levels) of a horizontal synchronizing term $T_{SYNC}$ of the video signal are detected, and the amplification processing is performed by use of $V_{SYNC2}$-$V_{SYNC1}$ as a reference level $V_{REF}$.

However, as shown in FIGS. 6A and 6B, the horizontal synchronizing term $T_{SYNC}$ is destroyed in accordance with an input situation or a preprocessing situation of the video signal, and the voltage level $V_{SYNC1}$ of the term is detected to be higher than a true value. In a case where the reference level $V_{REF}$ calculated from the thus detected voltage level $V_{SYNC1}$ is used as the reference level of the amplification processing, a gain of an amplifier increases more than necessary, as shown in FIG. 6. As a result, there is a problem that it is not possible to obtain the video signal having a desired output level or dynamic range.

SUMMARY OF THE INVENTION

A first aspect of the present invention is characterized by a signal processing circuit comprising an auto gain control circuit which amplifies and outputs a high definition television video signal, and the auto gain control circuit is configured to amplify the signal with an amplification ratio determined based on a first synchronous signal level having a positive potential with respect to a black level included in the high definition television video signal. Here, the amplification ratio is preferably determined based on a difference value between the first synchronous signal level and the black level.

A second aspect of the present invention is characterized by a signal processing circuit comprising an analog/digital converting section which digitizes a high definition television video signal, and the analog/digital converting section is configured to perform analog/digital conversion by use of a reference voltage determined based on a first synchronous signal level having a positive potential with respect to a black level included in the high definition television video signal.

DESCRIPTION OF THE PREFERRED EMBODIMENTS

Figure 1:
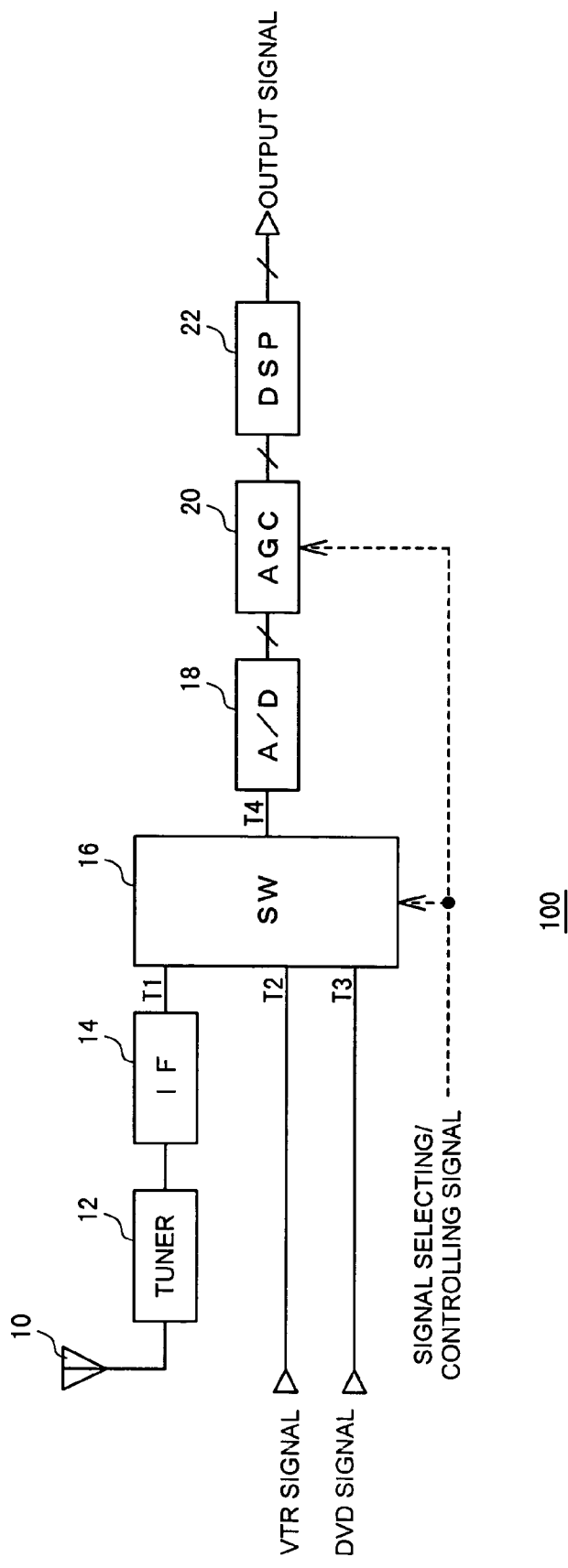
FIG. 1 is a block diagram showing the constitution of a signal processing circuit in an embodiment of the present invention.

A video signal processing circuit 100 in an embodiment of the present invention is constituted of, as shown in FIG. 1, an antenna 10, a tuner 12, an intermediate frequency converting section 14, a changeover switch 16, an analog/digital converting section (A/D converting section) 18, an auto gain control section 20 and a digital signal processing section 22.

The tuner 12 includes a band pass filter having a variable pass band. The tuner 12 receives radio waves of television broadcasting received by the antenna 10, and adjusts the pass band of the band pass filter in response to a channel control signal from the outside to obtain a signal having only a desired frequency band from received signals by filtering, and outputs the filtered signal. The radio waves of the television broadcasting include a signal (hereinafter referred to as "the HD signal") of high definition television broadcasting in addition to a conventional video signal (referred to as "the SD signal"). The present embodiment describes a case where the HD signal is an object of processing. The intermediate frequency converting section 14 includes a local oscillator, a mixer and the like. The intermediate frequency converting section 14 mixes a signal having an intermediate frequency band generated by the local oscillator with the signal having the frequency band selected by the tuner 12 to convert the signal having the frequency band selected by the tuner 12 into the intermediate frequency band signal suitable for signal processing, and outputs the converted signal.

The changeover switch 16 receives a signal selecting/controlling signal from the outside, selects any one from signals input via external terminals T1, T2 and T3 in response to the signal selecting/controlling signal, and outputs the selected signal to the A/D converting section 18 via an external terminal T4. The external terminals T1, T2 and T3 are connected to, for example, an output signal of the intermediate frequency converting section 14 and output terminals of a video tape player and a DVD player, respectively. The A/D converting section 18 receives an output signal from the changeover switch 16, and converts the signal into a digital signal having a predetermined bit number. The auto gain control section 20 converts the converted digital signal into a signal having a desired intensity, and outputs the signal to the digital signal processing section 22. The auto gain control section 20 will be described later. The digital signal processing section 22 subjects the signal to signal processing such as contour correction processing and strain correction processing, and outputs the processed signal as an output signal to a display unit such as a display.

Figure 2:
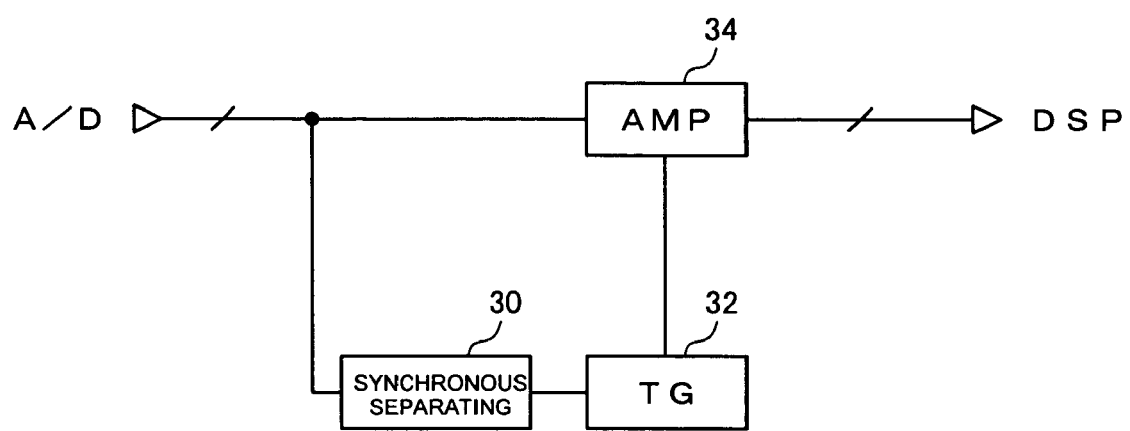
FIG. 2 is a block diagram showing a main part of an auto gain control circuit in the embodiment of the present invention.

As shown in FIG. 2, the auto gain control section 20 includes a synchronous separating section 30, a timing generator section 32 and a variable amplifying section 34. The auto gain control section 20 converts the digitized HD signal into a signal having a predetermined dynamic range, and outputs the converted signal.

Figure 3:
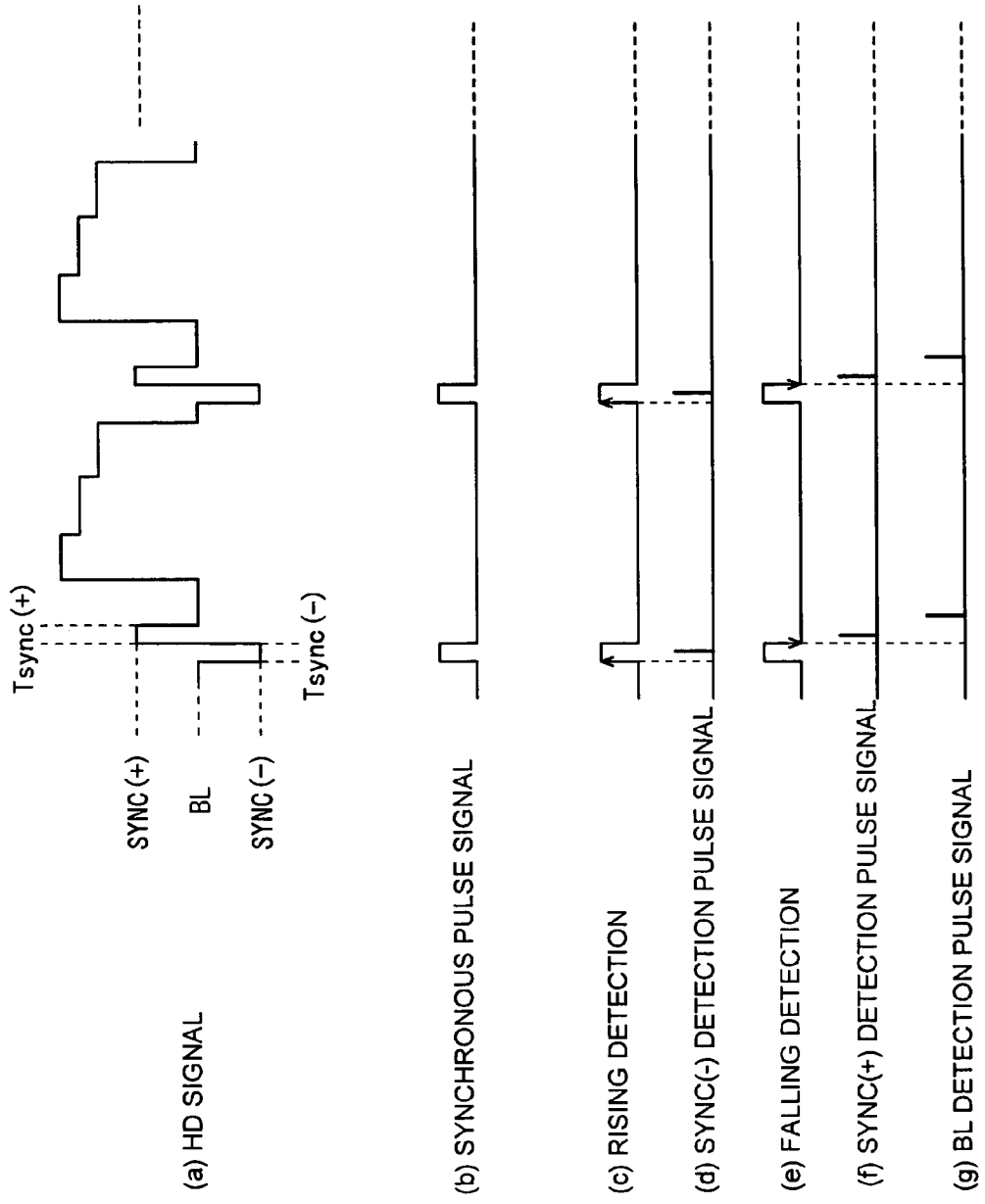
FIG. 3 is an explanatory view of auto gain control processing in the embodiment of the present invention.

The signal input into the auto gain control section 20 is input into the synchronous separating section 30 and the variable amplifying section 34. The synchronous separating section 30 includes a comparator, and it extracts a portion of the input signal having a voltage lower than a predetermined reference voltage, and outputs the portion. As shown in FIG. 3(a), the HD signal includes a synchronous signal level SYNC(−) having a negative potential with respect to a black level BL and additionally a synchronous signal level SYNC(+) having a positive potential with respect to the black level, as in the conventional SD signal. Thus, when the reference voltage of the comparator included in the synchronous separating section 30 is set to a voltage slightly lower than the black level BL, a synchronous signal level SYNC(−) term is extracted, and a synchronous pulse signal which rises only for the synchronous signal level SYNC(−) term is generated and output, as shown in FIG. 3(b).

The timing generator section 32 generates pulses indicating the synchronous signal level SYNC(−) term, a synchronous signal level SYNC(+) term and a black level term from the synchronous pulse signal extracted by the synchronous separating section 30 based on a system clock having a predetermined frequency (e.g., 74.25 MHz or 54 MHz), and outputs the pulses. As shown in FIG. 3(c), the timing generator section 32 detects a time when the synchronous pulse signal changes from a low level to a high level by use of a differentiating unit or the like. Then, the timing generator section 32 counts the system clock from the rising time, and as shown in FIG. 3(d), it generates and outputs a SYNC(−) detection pulse signal at a time when the counted number reaches a predetermined number indicating the vicinity of the center of the synchronous signal level SYNC(−) term.

Furthermore, as shown in FIG. 3(e), the timing generator section 32 detects a time when the synchronous pulse signal changes from the high level to the low level by use of the differentiating unit or the like. Then, it counts the system clock from the detected time, and as shown in FIGS. 3(f), (g), it generates and outputs a SYNC(+) detection pulse signal at a time when the counted number reaches a predetermined number indicating the vicinity of the center of the synchronous signal level SYNC(+) term. Furthermore, it generates and outputs a BL detection pulse signal at a time when the counted number reaches a predetermined number indicating the vicinity of the center of the black level term.

It is to be noted that the timing generator section 32 may detect the time when the synchronous pulse signal changes from the low level to the high level by use of the differentiating unit or the like, count the system clock from the time, generate and output the SYNC(+) detection pulse signal at a time when the counted number reaches the predetermined number indicating the vicinity of the center of the synchronous signal level SYNC(+) term, and generate and output the BL detection pulse signal at a time when the counted number reaches the predetermined number indicating the vicinity of the center of the black level term.

However, it is not necessary to always constantly generate and output all of the SYNC(−) detection pulse signal, the SYNC(+) detection pulse signal and the BL detection pulse signal. For example, the timing generator section 32 may receive the signal selecting/controlling signal, and generate and output at least the BL detection pulse signal and the SYNC(+) detection pulse signal based on the signal selecting/controlling signal in a case where the signal selected by the changeover switch 16 is the HD signal. In another case, the timing generator section 32 may generate and output the SYNC(−) detection pulse signal and the BL detection pulse signal.

The variable amplifying section 34 receives any of the SYNC(−) detection pulse signal, the SYNC(+) detection pulse signal and the BL detection pulse signal from the timing generator section 32, and extracts the synchronous signal level SYNC(−), the synchronous signal level SYNC(+) and the black level BL from the HD signal based on times when it has received the SYNC(−) detection pulse signal, the SYNC(+) detection pulse signal and the BL detection pulse signal.

However, the synchronous signal level SYNC(−), the synchronous signal level SYNC(+) and the black level BL do not have to be always constantly generated and extracted. When the timing generator section 32 generates only the BL detection pulse signal and the SYNC(+) detection pulse signal, levels of the BL detection pulse signal and the SYNC(+) detection pulse signal may be detected. When only the SYNC(−) detection pulse signal and the BL detection pulse signal are generated, levels of the SYNC(−) detection pulse signal and the BL detection pulse signal may be detected.

Next, a difference value S1 is obtained by subtracting the synchronous signal level SYNC(−) from the black level BL, and a difference value S2 is obtained by subtracting the black level BL from the synchronous signal level SYNC(+) by use of the comparator or the like.

However, both of the difference values S1 and S2 do not have to be always constantly calculated. For example, the variable amplifying section 34 receives the signal selecting/controlling signal, calculates at least the difference value S2 in a case where the signal selected by the changeover switch 16 based on the signal selecting/controlling signal is the HD signal, and calculate the difference value S1 in another case.

The variable amplifying section 34 amplifies the signal input from the A/D converting section 18 based on the calculated difference value S1 or S2, and outputs the amplified signal. That is, the amplification processing is performed using the difference value S1 or S2 (the voltage level) as the reference level VREF. At this time, when both of the difference values S1 and S2 are obtained, the difference value S2 is preferentially used, and the amplification processing is performed using the difference value S2 as the reference level $V_{REF}$.

In contrast to the synchronous signal level SYNC(−), the synchronous signal level SYNC(+) does not have such a problem of being destroyed by an input situation, preprocessing or the like. In a case where the HD signal is the processing object, the difference value S2 is obtained by subtracting the black level BL from the synchronous signal level SYNC(+) and used as the reference level of the amplification processing of the signal, whereby the amplification processing can be performed with a more appropriate amplification ratio. In consequence, a signal having an appropriate dynamic range can be obtained.

Figure 4:
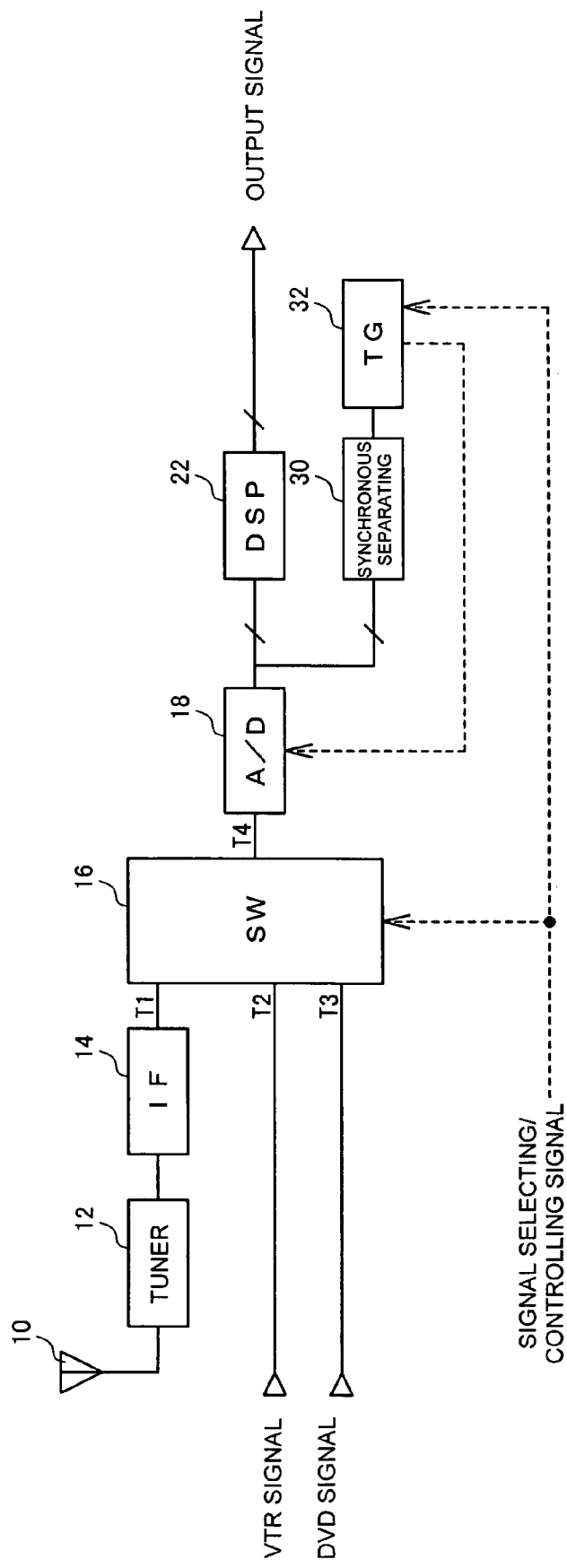
FIG. 4 is a block diagram showing a modified example of the constitution of the signal processing circuit in the embodiment of the present invention.
Figure 5A:
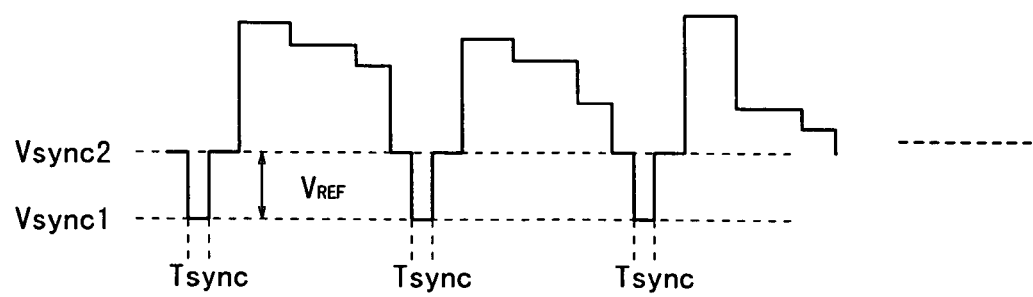
FIGS. 5A and 5B are explanatory views showing auto gain control processing in a background technology.
Figure 5B:
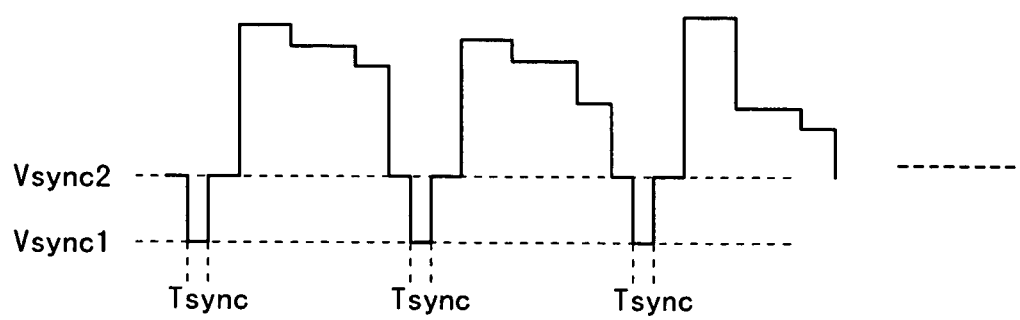
Figure 6A:
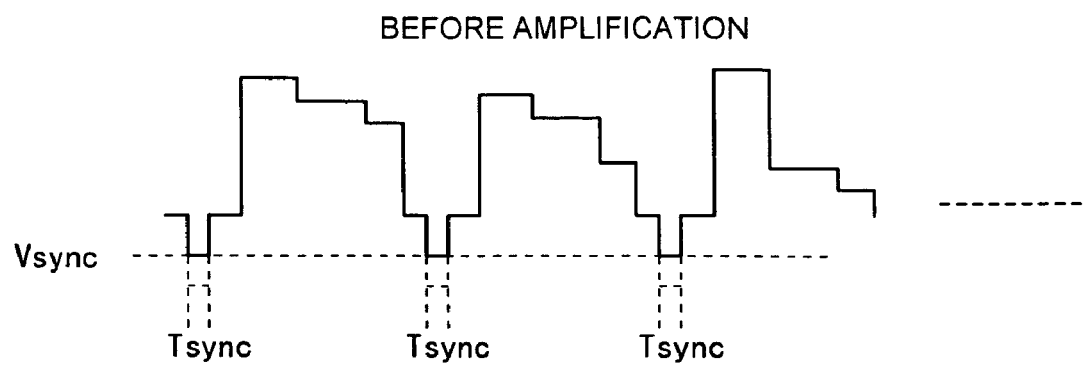
FIGS. 6A and 6B are explanatory views regarding a problem of the auto gain control processing in the background technology.
Figure 6B:
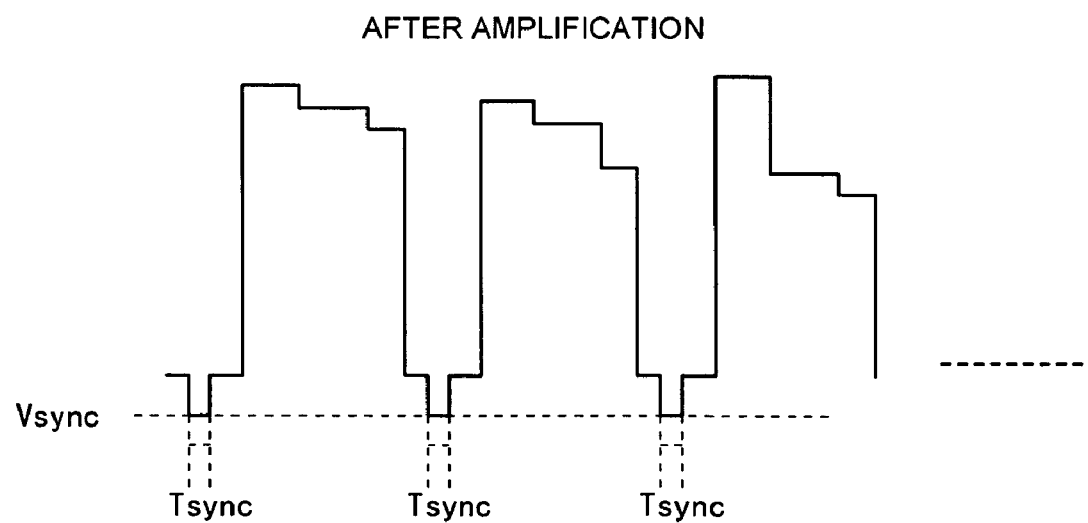

In a modified example, as shown in FIG. 4, the timing generator section 32 may feed back the SYNC(−) detection pulse signal, the SYNC(+) detection pulse signal and the BL detection pulse signal to the A/D converting section 18, and on the basis of any of these signals, a reference voltage of analog/digital conversion processing in the A/D converting section 18 may be set to thereby adjust the dynamic range.

The A/D converting section 18 extracts the synchronous signal level SYNC(−), the synchronous signal level SYNC(+) and the black level BL from the HD signal based on times when it has received the SYNC(−) detection pulse signal, the SYNC(+) detection pulse signal and the BL detection pulse signal, respectively. Then, the A/D converting section 18 obtains the difference value S1 by subtracting the synchronous signal level SYNC(−) from the black level BL, and obtains the difference value S2 by subtracting the black level BL from the synchronous signal level SYNC(+). On the basis of the thus calculated difference value S1 or S2, the A/D converting section 18 sets the reference voltage of the analog/digital conversion processing of the A/D converting section 18. Since the A/D converting section 18 sets the reference voltage to a zero level and converts the input signal into the digital signal, the dynamic range can be adjusted.

It is to be noted that in the present embodiment, an example of a constitution has been described in which the signal is digitally processed, and then the synchronous signal level SYNC(−), the synchronous signal level SYNC(+) and the black level BL are detected. However, the present invention is not limited to the above example, and an analog signal can be similarly processed.

As described above, during processing of a high definition television video signal, the signal processing can be realized with a desired amplification ratio. In consequence, it is possible to obtain the high definition television video signal having a desired dynamic range.

What is claimed is:

1. The signal processing circuit comprising:
    an auto gain control circuit which amplifies and outputs a high definition television video signal,
    wherein the auto gain control circuit is configured to amplify the signal with an amplification ratio determined based on a first synchronous signal level having a positive potential with respect to a black level included in the high definition television video signal, and
    wherein the amplification ratio is determined based on a difference value between the first synchronous signal level and the black level.

2. The signal processing circuit according to claim 1, wherein the auto gain control circuit detects the black level and the first synchronous signal level based on a second synchronous signal level having a negative potential with respect to the black level included in the high definition television video signal.

3. The signal processing circuit according to claim 1, wherein the auto gain control circuit detects the black level and the first synchronous signal level based on a second synchronous signal level having a negative potential with respect to the black level included in the high definition television video signal.

* * * * *